US009838662B2

(12) United States Patent
Zhang et al.

(10) Patent No.: US 9,838,662 B2
(45) Date of Patent: Dec. 5, 2017

(54) HARMONIZATION OF CROSS-COMPONENT PREDICTION AND ADAPTIVE COLOR TRANSFORM IN VIDEO CODING

(71) Applicant: QUALCOMM Incorporated, San Diego, CA (US)

(72) Inventors: Li Zhang, San Diego, CA (US); Jianle Chen, San Diego, CA (US); Rajan Laxman Joshi, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 14/871,235

(22) Filed: Sep. 30, 2015

(65) Prior Publication Data

US 2016/0105657 A1    Apr. 14, 2016

Related U.S. Application Data

(60) Provisional application No. 62/062,728, filed on Oct. 10, 2014.

(51) Int. Cl.
*H04N 9/75* (2006.01)
*H04N 9/64* (2006.01)
(Continued)

(52) U.S. Cl.
CPC ............... *H04N 9/75* (2013.01); *G06T 9/20* (2013.01); *H04N 5/23206* (2013.01);
(Continued)

(58) Field of Classification Search
CPC .......... H04N 9/75; H04N 19/85; H04N 19/50; H04N 5/23206; H04N 19/176;
(Continued)

(56) References Cited

U.S. PATENT DOCUMENTS

2016/0080751 A1*    3/2016    Xiu .................. H04N 19/124
375/240.02

OTHER PUBLICATIONS

Joint Collaborative Team on Video Coding (JCT-VC)of ITU-T SG 16 WP 3 and ISO/IEC JTC 1/SC 29/WG 11, 19th Meeting: Strasbourg, FR, Oct. 17-24, 2014 Document: JCTVC-S0180 Title: Adaptive color transform for different luma and chroma bit-depth Author(s) or Contact(s): Xiaoyu Xieu, Yuwen He, Yang Ye 9710 Scranton Rd, #250 San Diego, CA 92121, USA.*
(Continued)

*Primary Examiner* — Christopher S Kelley
*Assistant Examiner* — Nasim Nirjhar
(74) *Attorney, Agent, or Firm* — Shumaker & Sieffert, P.A.

(57) ABSTRACT

A video coder transforms, based on a difference between a bit depth of an initial luma sample and a bit depth of initial chroma samples, a set of initial samples to a set of modified samples. The set of initial samples may include the initial luma sample and the initial chroma samples. The initial chroma samples may include an initial Cb sample and an initial Cr sample. The set of modified samples may include a modified luma sample and modified chroma samples. The modified chroma samples may include a modified Cb sample and a modified Cr sample. Additionally, the video coder adds the modified samples to corresponding samples of a predictive block to produce reconstructed samples.

15 Claims, 8 Drawing Sheets

(51) Int. Cl.

| | |
|---|---|
| *H04N 19/136* | (2014.01) |
| *H04N 19/50* | (2014.01) |
| *H04N 19/176* | (2014.01) |
| *G06T 9/20* | (2006.01) |
| *H04N 5/232* | (2006.01) |
| *H04N 19/61* | (2014.01) |
| *H04N 19/60* | (2014.01) |
| *H04N 19/186* | (2014.01) |
| *H04N 19/85* | (2014.01) |

(52) U.S. Cl.
CPC ........... *H04N 9/642* (2013.01); *H04N 19/136* (2014.11); *H04N 19/176* (2014.11); *H04N 19/186* (2014.11); *H04N 19/50* (2014.11); *H04N 19/60* (2014.11); *H04N 19/61* (2014.11); *H04N 19/85* (2014.11)

(58) Field of Classification Search
CPC ...... H04N 19/136; H04N 19/61; H04N 19/60; H04N 19/186; H04N 9/642; G06T 9/20
See application file for complete search history.

(56) References Cited

OTHER PUBLICATIONS

Joint Collaborative Team on Video Coding (JCT-VC)of ITU-T SG 16 WP 3 and ISO/IEC JTC 1/SC 29/WG 11, 19th Meeting: Strasbourg, FR, Oct. 17-24, 2014 Document: JCTVC-S0086 Title: On residual adaptive colour transform Author(s) or Contact(s): Bin Li Jizheng Xu Gary Sullivan.*
JCT-VC of ITU-T SG 16 WP 3 and ISO/IEC JTC 1/SC 29/WG 11, 19th Meeting: Strasbourg, FR, Oct. 17-24, 2014 Document: JCTVC-S0180 (complete document of original edition), Title: Adaptive color transform for different luma and chroma bit-depth, Author(s) or Contact(s): Xiaoyu Xieu, Yuwen He, Yang Ye 9710 Scranton Rd, #250 San Diego, CA 92121, USA.*
JCT-VC of ITU-T SG 16 WP 3 and ISO/IEC JTC 1/SC 29/WG 11, 19th Meeting: Strasbourg, FR, Oct. 17-24, 2014, Document: JCTVC-S0086 (complete document of original edition), Title: On residual adaptive colour transform, Author(s) or Contact(s): Bin Li Jizheng Xu Gary Sullivan.*
Hsieh, et al., "Clipping for Cross Component Prediction and Adaptive Colour Transform," JCT-VC Meeting; Feb. 10-18, 2015; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-T0132-v4, Feb. 17, 2015; 6 pp.
Li, et al., "On residual adaptive colour transform", JCT-VC Meeting; Oct. 27-24, 2014; Strasbourg; (Joint Collaborative Team on Video Coding of ISO/IEC JTC1/SC29/WG11 and ITU-T SG.16); URL: http://wftp3.itu.int/av-arch/jctvc-site/; No. JCTVC-S0086, Oct. 8, 2014, 15 pp.
Xiu, et al., "Adaptive Color Transform for Different Luma and Chroma Bit-depth," JCT-VC Meeting; Oct. 17-24, 2014; Strasbourg; (Joint Collaborative Team on Video Coding of ISO/IEC JTC1/SC29/WG11 and ITU-T SG.16); URL: http://wftp3.itu.int/av-arch/jctvc-site/,, No. JCTVC-S0180, Oct. 8, 2014, 8 pp.
International Search Report and Written Opinion from International Application No. PCT/US2015/053534, dated Dec. 21, 2015, 15 pp.
Response to Written Opinion, dated Dec. 21, 2015, from International Application No. PCT/US2015/053534, filed on Jun. 21, 2016, 26 pp.
Second Written Opinion from International Application No. PCT/US2015/053534, dated Aug. 1, 2016, 6 pp.
Response to Second Written Opinion, dated Aug. 1, 2016, from International Application No. PCT/US2015/053534, filed on Sep. 30, 2016, 26.
International Preliminary Report on Patentability from International Application No. PCT/US2015/053534, dated Jan. 20, 2017, 7 pp.

Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (For FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Pu, et al., "Non-RCE1: Inter Color Component Residual Prediction," Joint Collaboration Team of Video Coding, ITU-T SG 16 WP 3 and ISO/IEC JTC 1/SC 29/WG 11, Jul. 25-Aug. 2, 2013, Document: JCTVC-N0266, 8 pp.
Pu, et al., "RCE1: Descriptions and Results for Experiments 1, 2, 3, and 4," Joint Collaboration Team of Video Coding, ITU-T SG 16 WP 3 and ISO/IEC JTC 1/SC 29/WG 11, Oct. 25-Nov. 1, 2013, Document: JCTVC-O0202_v3, 12 pp.
Wang, et al., "High Efficiency Video Coding (HEVC) Defect Report 2," Joint Collaboration Team of Video Coding, ITU-T SG 16 WP 3 and ISO/IEC JTC 1/SC 29/WG 11, Oct. 23-Nov. 1, 2013, Document: JCTVC-O1003_v2, 311 pp.
Wang, et al., "High Efficiency Video Coding (HEVC) Defect Report 4," Joint Collaboration Team of Video Coding, ITU-T SG 16 WP 3 and ISO/IEC JTC 1/SC 29/WG 11, Mar. 27-Apr. 4, 2014, Document: JCTVC-Q1003 (v.1), 314 pp.
Zhang, et al., "SCCE5 Test 3.2.1: In-loop color-space transform," Joint Collaboration Team of Video Coding, ITU-T SG 16 WP 3 and ISO/IEC JTC 1/SC 29/WG 11, Jun. 30-Jul. 9, 2014, Document: JCTVC-R0147, 8 pp.
Zhang, et al., "SCCE5 Test 3.2.1: In-loop color-space transform," Joint Collaboration Team of Video Coding, ITU-T SG 16 WP 3 and ISO/IEC JTC 1/SC 29/WG 11, Jun. 30-Jul. 9, 2014, Document: JCTVC-R0147_proposed text, 13 pp.
Joshi, et al., "High Efficiency Video Coding (HEVC) Screen Content Coding: Draft 1," Joint Collaboration Team of Video Coding,

(56) References Cited

OTHER PUBLICATIONS

ITU-T SG 16 WP 3 and ISO/IEC JTC 1/SC 29/WG 11, Jun. 30-Jul. 9, 2014, Document: JCTVC-R1005_v3, 362 pp.

Yu, et al., "Common conditions for screen content coding tests," Joint Collaboration Team of Video Coding, ITU-T SG 16 WP 3 and ISO/IEC JTC 1/SC 29/WG 11, Jun. 30-Jul. 9, 2014, Document: JCTVC-R1015, 5 pp.

Xiu, et al., "On inter-component de-correlation for screen content coding," Joint Collaboration Team of Video Coding, ITU-T SG 16 WP 3 and ISO/IEC JTC 1/SC 29/WG 11, Oct. 17-24, 2014, Document: JCTVC-S0179, 27 pp.

Wang et al., "High Efficiency Video Coding (HEVC) Defect Report 3," (Joint Collaborative Team on Video Coding of ITU-T SG.16 WP 3 and ISO/IEC JTC 1/SC29/WG11); Document: JCTVC-P1003_v1, Jan. 9-17, 2014, 313 pp. [uploaded in parts].

Flynn, et al., "High Efficiency Video Coding (HEVC) Range Extensions text specification: Draft 7," (Joint Collaborative Team on Video Coding of ITU-T SG.16 WP 3 and ISO/IEC JTC 1/SC29/WG11); Mar. 27-Apr. 4, 2014, 363 pp.

\* cited by examiner

HARMONIZATION OF CROSS-COMPONENT PREDICTION AND ADAPTIVE COLOR TRANSFORM IN VIDEO CODING This patent application claims the benefit of U.S. Provisional Patent Application 62/062,728, filed Oct. 10, 2014, the entire content of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards, such as scalable video coding (SVC), multiview video coding (MVC), scalable HEVC (SHVC), multiview HEVC (MV-HEVC), 3D-HEVC, the HEVC Range Extension, and the HEVC Screen Content Coding (SCC) Extensions. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding tree units (CTUs), coding units (CUs) and/or coding nodes. Video blocks may include luma blocks and chroma blocks. In an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients may be entropy coded to achieve even more compression.

SUMMARY

A video coder, such as a video encoder or video decoder, may perform a transform that combines a color component prediction transform and a color transform. The combined transform uses a difference between a bit depth of an initial luma sample and a bit depth of initial chroma samples. Thus, in some examples, the video coder transforms, based on a difference between a bit depth of an initial luma sample and a bit depth of initial chroma samples, a set of initial samples to a set of modified samples, the set of initial samples including the initial luma sample and the initial chroma samples.

In one example, this disclosure describes a method of decoding video data, the method comprising: transforming, based on a difference between a bit depth of an initial luma sample and a bit depth of initial chroma samples, a set of initial samples to a set of modified samples, the set of initial samples including the initial luma sample and the initial chroma samples, the set of modified samples including a modified luma sample and modified chroma samples; and adding the modified samples to corresponding samples of a predictive block to produce reconstructed samples of the video data.

In another example, this disclosure describes a device for coding video data, the device comprising: a data storage medium configured to store the video data; and one or more processors configured to: transform, based on a difference between a bit depth of an initial luma sample and a bit depth of initial chroma samples, a set of initial samples to a set of modified samples, the set of initial samples including the initial luma sample and the initial chroma samples, the set of modified samples including a modified luma sample and modified chroma samples; and add the modified samples to corresponding samples of a predictive block to produce reconstructed samples of the video data.

In another example, this disclosure describes a device for coding video data, the device comprising: means for transforming, based on a difference between a bit depth of an initial luma sample and a bit depth of initial chroma samples, a set of initial samples to a set of modified samples, the set of initial samples including the initial luma sample and the initial chroma samples, the set of modified samples including a modified luma sample and modified chroma samples; and means for adding the modified samples to corresponding samples of a predictive block to produce reconstructed samples of the video data.

In another example, this disclosure describes a computer-readable storage medium (e.g., a non-transitory computer-readable storage medium) having stored thereon instructions, that when executed, cause a device for coding video data to: transform, based on a difference between a bit depth of an initial luma sample and a bit depth of initial chroma samples, a set of initial samples to a set of modified samples, the set of initial samples including the initial luma sample and the initial chroma samples, the set of modified samples including a modified luma sample and modified chroma samples; and add the modified samples to corresponding samples of a predictive block to produce reconstructed samples of the video data.

The details of one or more examples of the disclosure are set forth in the accompanying drawings and the description

DETAILED DESCRIPTION

Figure 1:
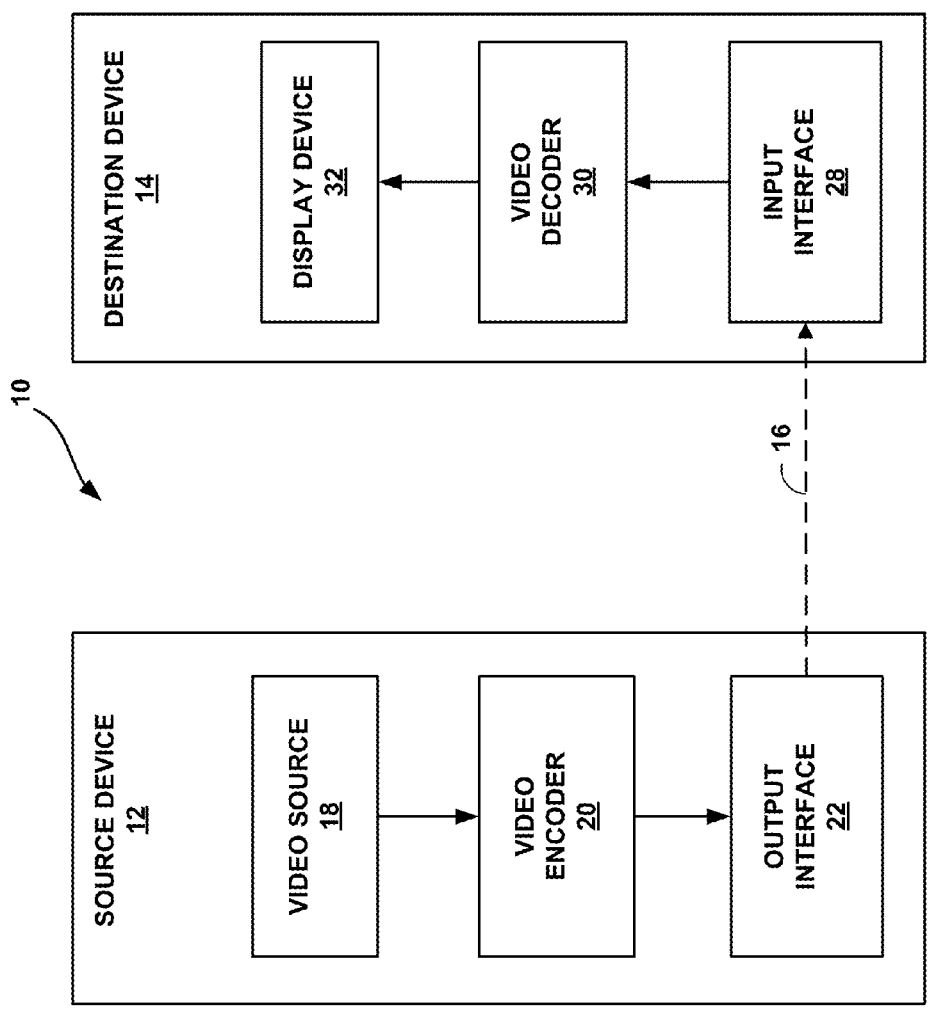
FIG. 1 is a block diagram illustrating an example video encoding and decoding system that may perform techniques in accordance with one or more aspects of this disclosure.

In video coding, a picture comprises an array of pixels. Each pixel of a picture may comprise a set of samples. For instance, a pixel may comprise a red sample, a green sample, and a blue sample. The luminance of each of the red, green, and blue samples control the perceived color and brightness of the pixel. Pixels comprising a red sample, a green sample, and a blue sample are said to be in the RGB format. In some examples, pixels comprise a luma sample corresponding to the luminance of a pixel (i.e., a Y sample) and two chrominance samples corresponding to the chrominance of the sample (i.e., a U sample, and a V sample).

When encoding a video data, a video encoder may generate residual data for a block as the difference between the block and one or more predictive blocks. The video encoder may use motion compensation or intra prediction to generate the predictive blocks. Furthermore, the video encoder may apply a color transform to convert residual samples in the RGB format into samples in another format, such as the YCbCr format or YCoCg format. In some examples, the video encoder uses an adaptive color transform (ACT). When the video encoder uses ACT, the video encoder applies a color transform adaptively on a block-by-block basis. For instance, the video encoder may apply the color transform to some blocks of a picture, but not other blocks of the same picture. The video encoder may signal whether the video encoder applied the color transform to particular blocks.

While the color transform may reduce the amount of data, the video encoder may achieve further reductions by applying a cross-component prediction (CCP) transform. The CCP transform may remove correlation among color components by using a luma component as a predictor for chroma components. Following application of the CCP transform, the video encoder may apply another transform, such as a Discrete Cosine Transform (DCT) to convert residual samples to transform coefficients in a frequency domain. The video encoder may then quantize the transform coefficients and entropy encode syntax elements representing the quantized transform coefficients.

A video decoder may reverse the transforms to obtain residual sample values in the original color format. For example, the video decoder may receive a bitstream comprising a block of transform coefficients. In this example, the video decoder applies an inverse transform to convert the transform coefficients from the frequency domain into a block of residual samples. Furthermore, the video decoder applies an inverse CCP transform to the block of residual samples. After applying the inverse CCP transform, the video decoder may apply an inverse color transform to the block of residual samples. For instance, the video decoder may apply an inverse ACT to the block of residual samples. Subsequently, the video decoder may reconstruct a block of video data at least in part by adding samples in the block of residual samples to corresponding samples of a predictive block generated using motion compensation or intra prediction.

Xiaoyu Xiu et al., "On inter-component de-correlation for screen content coding," Joint Collaborative Team on Video Coding (JCT-VC) of ITU-T SG 16 WP 3 and ISO/IEC JTC 1/SC 29/WG 11, 18th Meeting: Sapporo, J P, 30 Jun.-9 Jul. 2014, document JCTVC-S0179 (hereinafter, JCTVC-S0179), which is available at http://phenix.int-evey.fr/jct/doc_end_user/current_document.php?id=9626, described combining the ACT and CCP transform into a single combined transform. However, the combined transform described by JCTVC-S0179 increased the internal bit depth of samples by 3. Furthermore, the combined transform described by JCTVC-S0179 involved a number of complicated multiplication operations because absolute values of transform coefficients in the combined transform are no longer less than 2.

This disclosure describes techniques addressing this issue. As described herein, when the inverse CCP and inverse ACT are combined together, i.e., using one step instead of two consecutive steps, and for the determination of the bits of right shift at the final stage of the combined transform process, the difference of the bit-depth of luma and components is taken into consideration instead of just considering the bit depth of the luma component. Thus, in some examples, a video coder transforms, based on a difference between a bit depth of an initial luma sample and a bit depth of initial chroma samples, a set of initial samples to a set of modified samples, the set of initial samples including the initial luma sample and the initial chroma samples.

For example, a video coder, such as a video encoder or video decoder, may transform a set of initial samples to a set of modified samples. In this example, the set of initial samples includes an initial luma sample and initial chroma samples. The initial chroma samples may include an initial Cb sample and an initial Cr sample. The set of modified samples may include a modified luma sample and modified chroma samples. The modified chroma samples may include a modified Cb sample and a modified Cr sample. The video coder may add the modified samples to corresponding samples of a predictive block to produce reconstructed samples.

In this example, as part of applying the transform, the video coder determines a bit shift value as 3 plus a maximum of 0 and a value equal to a bit depth of the initial luma sample minus a bit depth of the initial chroma samples. Furthermore, the video coder determines a first parameter value as 1 left shifted by the bit shift value. The video coder determines a second parameter value as a cross-component prediction parameter for the initial Cb sample left shifted by a maximum of 0 and a value equal to the bit depth of the initial chroma samples minus the bit depth of the initial luma sample. The video coder determines a third parameter value as a cross-component prediction parameter for the initial Cr sample left shifted by a maximum of 0 and the value equal to the bit depth of the initial chroma samples minus the bit depth of the initial luma sample.

In this example, the video coder determines a luma residual coefficient value as a sum of the first parameter value and the second parameter value, multiplied by the initial luma sample, plus the first parameter value multiplied by the initial Cb sample. The video coder determines a first chroma residual coefficient value as a difference between a first intermediate value and a second intermediate value. In this example, the first intermediate value is equal to the first parameter value minus the second parameter value, multiplied by the initial luma sample, minus the first parameter value times the initial Cb sample. Furthermore, in this example, the second intermediate value is equal to the third parameter value multiplied by the initial luma sample, plus the first parameter value multiplied by the initial Cr sample. The video coder determines a second chroma residual coefficient value as a sum of the first intermediate value and the second intermediate value.

In this example, the video coder determines the modified luma sample as the luma residual coefficient value right shifted by the bit shift value. The video coder determines the modified Cb sample as the first chroma coefficient value right shifted by the bit shift value. The video coder determines the modified Cr sample as the second chroma coefficient value right shifted by the bit shift value.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory. Video encoder 20 and video decoder 30 may comprise memories configured to store video data. Video encoder 20 may encode the video data stored in the memory. Video decoder 30 may decode encoded video data and store the resulting video data in the memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternatively, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as the High Efficiency Video Coding (HEVC) standard. Wang et al, "High Efficiency Video Coding (HEVC) Defect Report 4," Joint Collaborative Team on Video Coding (JCT-VC) of ITU-T SG 16 WP 3 and ISO/IEC JTC 1/SC 29/WG 11, 17$^{th}$ Meeting: Valencia, E S, 27 Mar.-4 Apr. 2014, document JCTVC-Q1003 (v.1) (hereinafter, "JCTVC-Q1003") is a document describing HEVC. In this disclosure, the HEVC specification text as in JCTVC-Q1003 may be referred to as "HEVC version 1." In addition to the base HEVC standard, there are ongoing efforts to produce scalable video coding, multiview video coding, and 3D coding extensions for HEVC.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU. In monochrome pictures or pictures having three separate color planes, a PU may comprise a single prediction block and syntax structures used to predict the prediction block.

Figure 2:
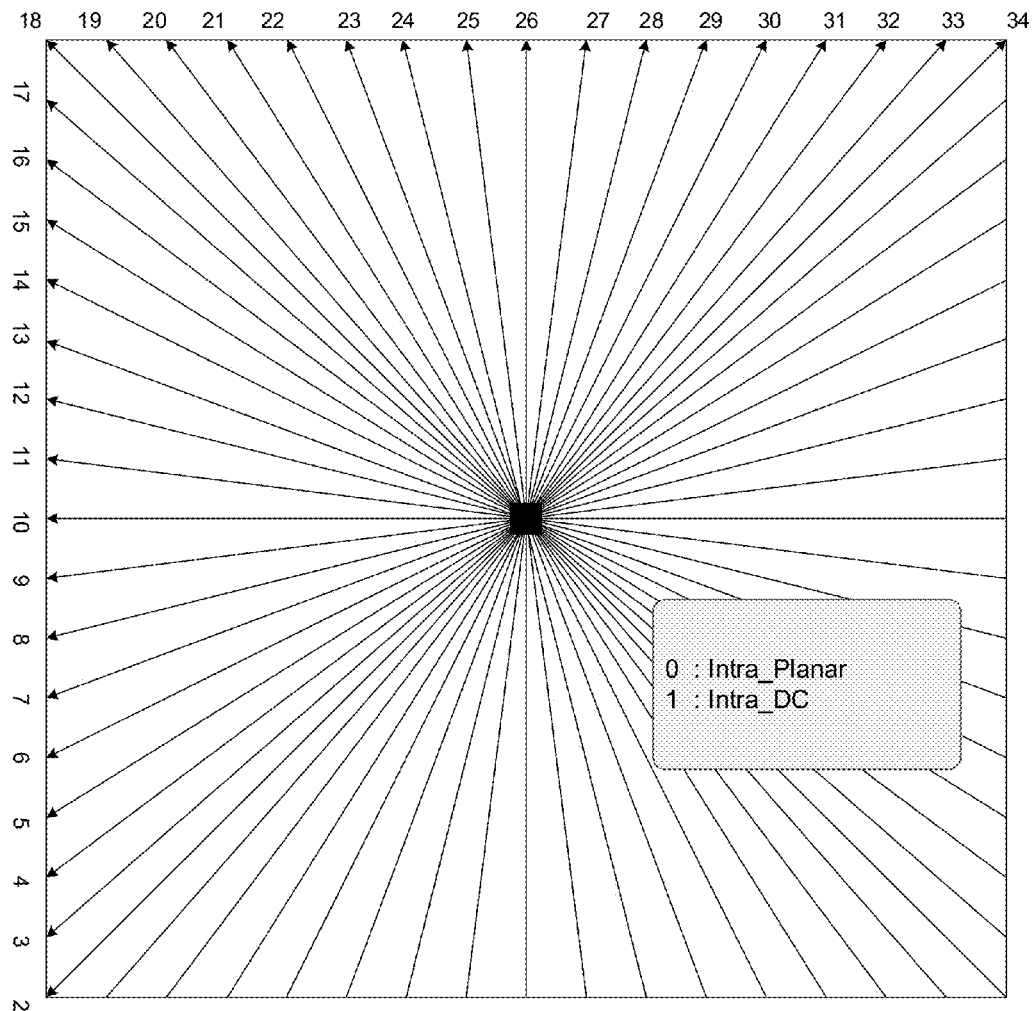
FIG. 2 is a conceptual diagram illustrating intra prediction modes in High Efficiency Video Coding (HEVC).

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. In HEVC Version 1, for the luma component of each PU, an intra prediction method is utilized with 33 angular prediction modes (indexed from 2 to 34), DC mode (indexed with 1) and Planar mode (indexed with 0), as shown in FIG. 2. FIG. 2 is a conceptual diagram illustrating intra prediction modes in High Efficiency Video Coding (HEVC).

In addition to the above 35 intra modes, one more mode, named 'I-PCM', is also employed by HEVC. In I-PCM mode, prediction, transform, quantization, and entropy coding are bypassed while the prediction samples are coded by a predefined number of bits. The main purpose of the I-PCM mode is to handle the situation when the signal cannot be efficiently coded by other modes.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector. When video encoder 20 uses bi-prediction to generate the predictive blocks for a PU, the PU may have two motion vectors.

After video encoder 20 generates predictive blocks (e.g., predictive luma, Cb, and Cr blocks) for one or more PUs of a CU, video encoder 20 may generate a residual block of the CU. Each sample in a residual block of the CU indicates a difference between a sample in a predictive block for a PU of the CU and a corresponding sample in a coding block of the CU. For example, video encoder 20 may generate a luma residual block of the CU. Each sample in the luma residual block of the CU indicates a difference between a luma sample in a predictive luma block of a PU of the CU and a corresponding sample in the luma coding block of the CU.

In addition, video encoder 20 may generate a Cb residual block of the CU. Each sample in the Cb residual block of the CU may indicate a difference between a Cb sample in a predictive Cb block of a PU of the CU and a corresponding sample in the Cb coding block of the CU. Video encoder 20 may also generate a Cr residual block of the CU. Each sample in the Cr residual block of the CU may indicate a difference between a Cr sample in a predictive Cr block for a PU of the CU and a corresponding sample in the Cr coding block of the CU.

Furthermore, video encoder 20 may use quad-tree partitioning to decompose the residual blocks (e.g., luma, Cb, and Cr residual blocks) of a CU into one or more transform blocks (e.g., luma, Cb, and Cr transform blocks). A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the luma residual block of the CU. The Cb transform block may be a sub-block of the Cb residual block of the CU. The Cr transform block may be a sub-block of the Cr residual block of the CU. In monochrome pictures or pictures having three separate color planes, a TU may comprise a single transform block and syntax structures used to transform the samples of the transform block.

Video encoder 20 may apply one or more transforms to a transform block for a TU to generate a coefficient block for the TU. For example, video encoder 20 may apply one or more transforms to a luma transform block for a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU. A coefficient block may be a two-dimensional array of transform coefficients. A transform coefficient may be a scalar quantity.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream. The bitstream may comprise an encoded representation of video data.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for Supplemental Enhancement Information (SEI), and so on. NAL units that encapsulate RBSPs for video coding data (as opposed to RBSPs for parameter sets and SEI messages) may be referred to as video coding layer (VCL) NAL units.

In the example of FIG. 1, video decoder 30 receives a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use intra prediction or inter prediction to determine predictive blocks of the PUs of a current CU. In addition, video decoder 30 may inverse quantize coefficient blocks for TUs of the current CU. Video decoder 30 may perform inverse transforms on the coefficient blocks to reconstruct transform blocks for the TUs of the current CU. Video decoder 30 may reconstruct the coding blocks of the current CU by adding the samples of the predictive blocks for PUs of the current CU to corresponding samples of the transform blocks for the TUs of the current CU. By reconstructing the coding blocks for each CU of a picture, video decoder 30 may reconstruct the picture.

In the HEVC standard, there are two inter prediction modes, named merge mode and advanced motion vector prediction (AMVP) modes respectively for a PU. The so-called skip mode is considered as a special case of merge mode. In either the AMVP mode or the merge mode, a video coder maintains a motion vector (MV) candidate list for multiple motion vector predictors. The motion vector(s), as well as reference indices in the merge mode, of a PU are generated by taking one candidate from the MV candidate list.

In some examples, the MV candidate list contains up to five candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each respective potential prediction direction from either list 0 or list 1, video encoder 20 explicitly signals a respective reference index, together with an MVP index to the MV candidate list since each AMVP candidate contains only a motion vector. In AMVP mode, the predicted motion vectors can be further refined. As can be seen above, a merge candidate corresponds to a full set of motion information while an AMVP candidate contains just one motion vector for a specific prediction direction and reference index. The candidates for both modes are derived similarly by video encoder 20 and video decoder 30 from the same spatial and temporal neighboring blocks.

Figure 3B:
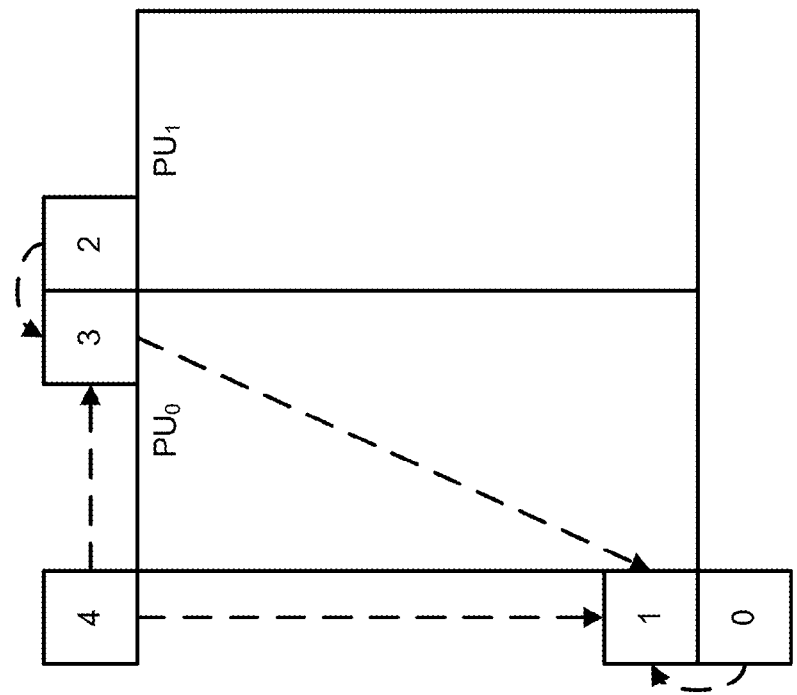
FIG. 3B is a conceptual diagram illustrating example spatial neighboring motion vector candidates for advanced motion vector prediction (AMVP) mode.
Figure 3A:
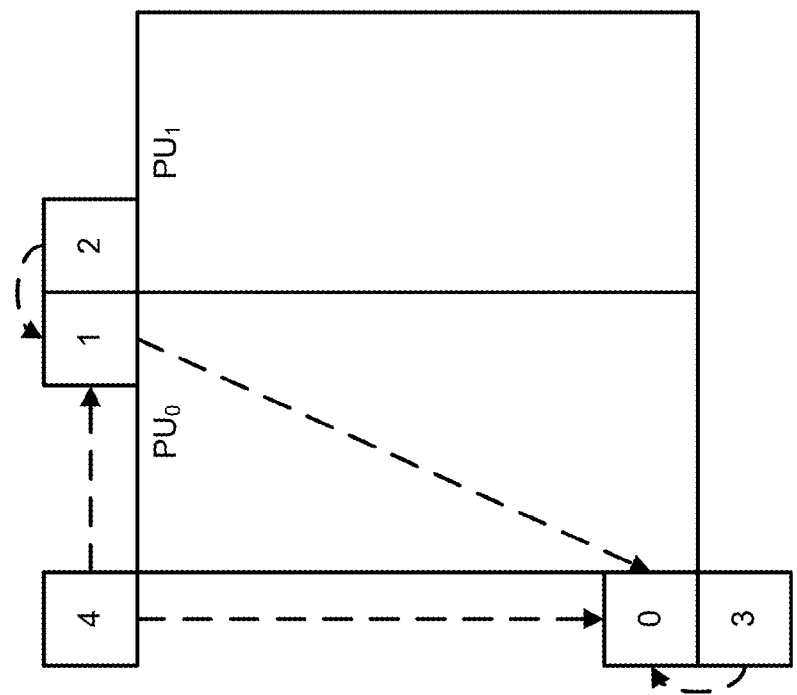
FIG. 3A is a conceptual diagram illustrating example spatial neighboring motion vector candidates for merge mode.

FIG. 3A is a conceptual diagram illustrating example spatial neighboring motion vector candidates for merge mode. FIG. 3B is a conceptual diagram illustrating example spatial neighboring motion vector candidates for AMVP mode. A video coder (e.g., video encoder 20 or video decoder 30) may derive spatial MV candidates from the neighboring blocks shown in FIG. 3A and FIG. 3B, for a specific PU ($PU_0$), although the methods generating the candidates from the blocks differ for merge and AMVP modes. In merge mode, up to four spatial MV candidates can be derived with the orders shown in FIG. 3A with numbers, and the order is the following: left (0), above (1), above right (2), below left (3), and above left (4), as shown in FIG. 3A.

In AMVP mode, the neighboring blocks are divided into two groups: a left group consisting of blocks 0 and 1, and an above group consisting of blocks 2, 3, and 4, as shown in FIG. 3B. For each group, the potential candidate in a neighboring block referring to the same reference picture as that indicated by the signaled reference index has the highest priority to be chosen to form a final candidate of the group. It is possible that none of the neighboring blocks contains a motion vector pointing to the same reference picture. Therefore, if such a candidate cannot be found, the video coder may scale the first available candidate to form the final candidate; thus, the temporal distance differences can be compensated.

The HEVC Range Extension, which is an extension to the HEVC standard, adds support to HEVC for additional color representations (also referred to as "color formats"), as well as for increased color bit-depth. A draft of the HEVC Range Extension is: Flynn et al., "HEVC Range Extension text specification: Draft 7," $17^{th}$ Meeting: Valencia, E S, 27 Mar.-4 Apr. 2014, document JCTVC-Q1005_v7 (hereinafter, JCTVC-Q1005), which is available from http://phenix-.int-evey.fr/jct/doc_end_user/documents/17_Valencia/wg11/JCTVC-Q1005-v9.zip. A color bit-depth is the number of bits used to represent each component of a color representation. The support for other color formats may include support for encoding and decoding RGB sources of video data, as well as video data having other color representations and using different chroma subsampling patterns than the HEVC main profile.

Another extension of HEVC, namely screen content coding (SCC), for coding screen-content material such as text and graphics with motion is being developed. A draft of the SCC extension is: Joshi et al., "High Efficiency Video Coding (HEVC) Screen Content Coding: Draft 1," Joint Collaborative Team on Video Coding (JCT-VC) of ITU-T SG 16 WP 3 and ISO/IEC JTC 1/SC 29/WG 11, 18th Meeting: Sapporo, J P, 30 Jun.-9 Jul. 2014, document JCTVC-R1005_v3 (hereinafter, "JCTVC-R1005"), which is available from http://phenix.int-evey.fr/jct/doc_end_user/documents/18_Sapporo/wg11/JCTVC-R1005-v3.zip, is a working draft (WD) of SCC.

Figure 4:
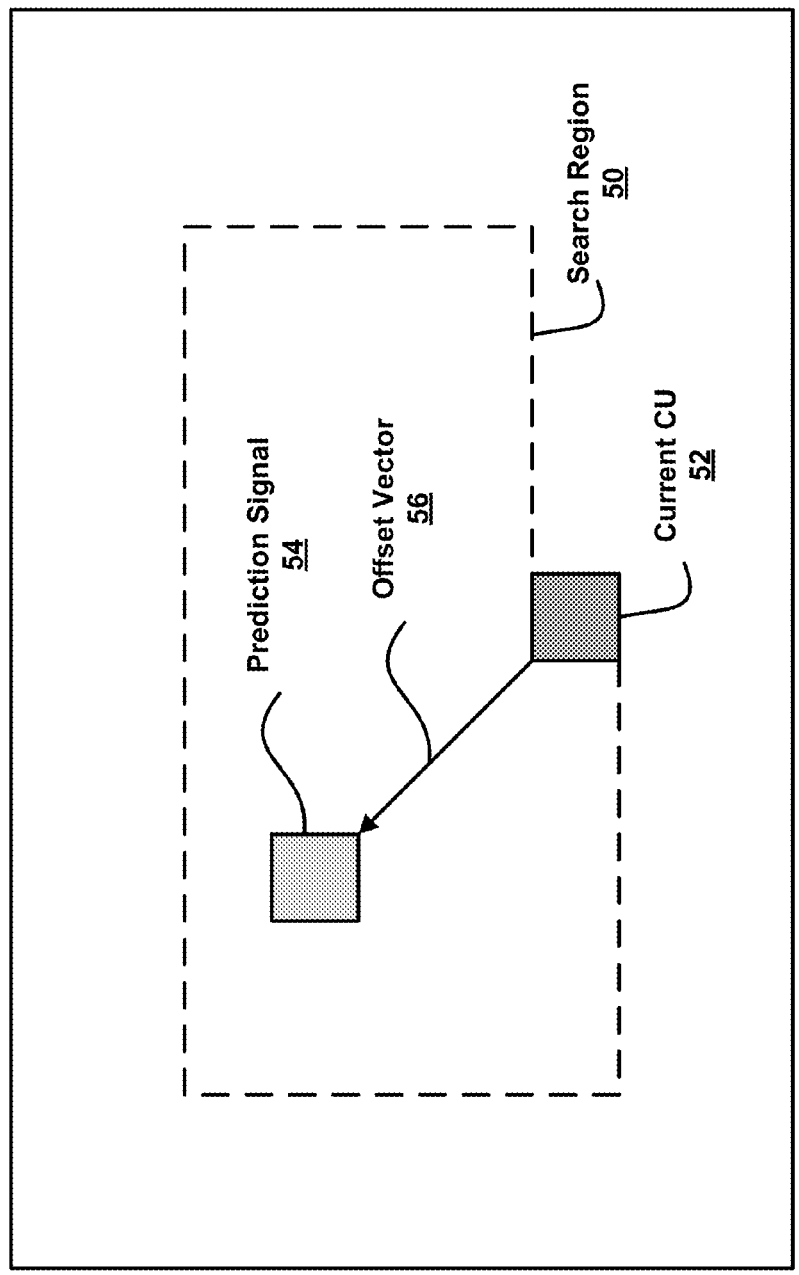
FIG. 4 is a conceptual diagram illustrating an example of intra block copy.

The Intra Block-Copy (BC) mode has been included in the SCC extension of HEVC. An example of Intra BC is shown in FIG. 4, wherein the current CU is predicted from an already decoded block of the current picture/slice. In other words, FIG. 4 is a conceptual diagram illustrating an example of intra BC. The current Intra BC block size can be as large as a CU size, which ranges from 8×8 to 64×64, although for some applications, further constraints may apply.

As shown in the example of FIG. 4, video encoder 20 may perform a search within a search region 50 for a block that most closely matches a prediction block of a PU of a current CU 52, e.g., based on pixel difference values. In the example of FIG. 4, video encoder 20 has identified a block, labeled prediction signal 54, as the block most closely matching the prediction block. Video encoder 20 determines an offset vector 56 indicating a displacement of prediction signal 54 relative to the prediction block.

The pixels of each block of video data each represent color in a particular format, referred to as a "color representation." Different video coding standards may use different color representations for blocks of video data. As one example, the main profile of the High Efficiency Video Coding (HEVC) video standard, which is under development by the Joint Collaborative Team on Video Coding (JCT-VC), uses the YCbCr color representation to represent the pixels of blocks of video data.

The YCbCr color representation generally refers to a color representation in which each pixel of video data is represented by three components or channels of color information, "Y," "Cb," and "Cr." The Y channel represents luminance (i.e., light intensity or brightness) data for a particular pixel. The Cb and Cr components are the blue-difference and red-difference chrominance, i.e., "chroma," components, respectively. YCbCr is often used to represent color in compressed video data because there is strong decorrelation between each of the Y, Cb, and Cr components, meaning that there is little data that is duplicated or redundant among each of the Y, Cb, and Cr components. Coding video data using the YCbCr color representation therefore offers good compression performance in many cases.

The YCgCo color representation generally refers to a color representation in which each pixel of video data is represented by three components or channels of color information, "Y," "$C_g$," and "$C_o$." As in YCbCr, the Y channel represents luminance (i.e., light intensity or brightness) data for a particular pixel. The $C_g$ and $C_o$ components are the green-difference and orange-difference chrominance, i.e., "chroma," components, respectively. A potential advantage of the YCgCo color model over the YCbCr color model is simpler and faster computation, and better decorrelation of the color planes to improve compression performance.

The HEVC main profile uses YCbCr because of the generally strong color decorrelation between the luma component, and the two chroma components of the color representation (also referred to as a color format). In some cases, however, there may still be correlations among Y, Cb, and Cr components. The correlations between components of a color representation may be referred to as cross-color component correlation or inter-color component correlation. A video coder may be configured to predict the value of one component (e.g., a sample of a chroma component) based on the value of a different component (e.g., a samples of a luma component). The process of predicting samples from a first component based on a second component is referred to as "cross-component prediction for color video" or "inter-color component prediction." A video coder may predict the value of the first component based on the correlation between the first component and the second component.

Cross-component prediction (CCP) was described in Pu et al., "RCE1: Descriptions and Results for Experiments 1, 2, 3, and 4," Joint Collaborative Team on Video Coding (JCT-VC) of ITU-T SG 16 WP 3 and ISO/IEC JTC 1/SC 29/WG 11, 15$^{th}$ Meeting: Geneva, C H, 25 Oct.-1 Nov. 2013, document JCTVC-O0202, available at http://phenix.int-evry.fr/jct/doc_end_user/documents/15_Geneva/wg11/JCTVC-O0202-v5.zip (hereinafter, "JCTVC-O0202") and employed by both HEVC Range and SCC extensions. JCTVC-O0202 described removing the correlation among color components by using luma residual as a predictor for chroma components. A set of scaling parameters is predefined and one of them is selected and signalled in the bitstream. This prediction is performed both for intra- and inter-coded blocks. However, in case of intra coding, only those with DM chroma mode (i.e., the chroma prediction mode is identical to the luma prediction mode when the partition size is equal to 2N×2N, while the chroma prediction mode is identical to the luma prediction mode associated with the first (top-left) prediction unit when the partition size is equal to N×N) are allowed to use this prediction. In JCTVC-O0202, a scaling parameter may be selected for each transform block.

As described in JCTVC-O0202, $r_C(x,y)$ represents a final chroma reconstructed residual sample at a position (x,y), $r'_C(x,y)$ represents a reconstructed chroma residual sample from the bitstream at a position (x,y), and $r_L(x,y)$ represents a reconstructed residual sample in the luma component at a position (x,y). In the CCP process of JCTVC-O0202, a video encoder predicts the chroma residual as:

$$r_C'(x,y) = r_C(x,y) - (\alpha \times r_L(x,y)) >> 3 \qquad (1)$$

A video decoder performs an inverse CCP process that compensates the chroma residual as:

$$r_C(x,y) = r_C'(x,y) + (\alpha \times r_L(x,y)) >> 3 \qquad (2)$$

The video encoder calculates and signals the scaling parameter α.

Furthermore, in JCTVC-O0202, if $BD_c$ (i.e., the bit depth of chroma samples) is assumed to be equal to $BD_Y$ (i.e., the bit depth of luma samples), the reverse CCP process can be represented by the following matrix multiplication:

$$\begin{bmatrix} Y \\ U' \\ V' \end{bmatrix} = M_{inv-CCP} \begin{bmatrix} Y \\ U \\ V \end{bmatrix} = \frac{1}{8}\begin{bmatrix} 8 & 0 & 0 \\ a_{Cg} & 8 & 0 \\ a_{Co} & 0 & 8 \end{bmatrix}\begin{bmatrix} Y \\ U \\ V \end{bmatrix} \qquad (3)$$

wherein $M_{inv-CCP}$ are the matrices of the inverse CCP, $\alpha_{C_g}$ and $\alpha_{C_o}$ are the signaled CCP parameters of chroma components, respectively. Thus, $\alpha_{C_g}$ corresponds to the scaling parameter α that would be used in equation (2) for compensating the $C_g$ chroma value and $\alpha_{C_o}$ corresponds to the scaling parameter α that would be used in equation (2) for compensating the $C_o$ chroma value.

HEVC Version 1 allows the use of different bit-depths for luma and chroma components. To consider the case where the bit-depth for luma and chroma components are different, equation (2) may be further modified to:

$$r_C(x,y) = r_C'(x,y) + ((((\alpha \times r_L(x,y)) << BD_c) >> BD_Y) >> 3) \qquad (4)$$

In equation (4), $BD_c$ and $BD_Y$ are the bit-depth of chroma and luma, respectively. $BD_c$, $BD_Y$ are denoted by $BitDepth_C$ and $Bitdepth_Y$, respectively. In this case, the $M_{inv-CCP}$ of equation (3) may be modified to be:

$$M_{inv-CCP} = \qquad (5)$$
$$\frac{1}{2^{3+BD_Y}}\begin{bmatrix} 1 << (3+BD_Y) & 0 & 0 \\ a_{cg} << BD_C & 1 << (3+BD_Y) & 0 \\ a_{co} << BD_C & 0 & 1 << (3+BD_Y) \end{bmatrix}$$

The scaling parameter α can be chosen from the set of values {−8, −4, −2, −1, 0, 1, 2, 4, 8}, inclusively. The video encoder may use a rate-distortion metric to choose the scaling parameter α. In some examples, the video encoder may use another fast algorithm to calculate the cost for different scaling parameter. When α=0, the inter-component residual prediction is turned off. For each TU, the video encoder may select the best α that is suitable for the TU, e.g., a TU level on/off switch is employed in HEVC Range Extension and SCC Extension.

A CU-level adaptive color transform (ACT) was described in Zhang et al., "SCCE5 Test 3.2.1: In-loop color-space transform," Joint Collaborative Team on Video Coding (JCT-VC) of ITU-T SG 16 WP 3 and ISO/IEC JTC 1/SC 29/WG 11, 18th Meeting: Sapporo, J P, 30 Jun.-9 Jul. 2014, document JCTVC-R0147 (hereinafter, "JCTVC-R0147), available at http://phenix.int-evry. fr/jct/doc_en-d_user/documents/18_Sapporo/wg11/JCTVC-R0147-v2.zip), and adopted in 18th JCTVC meeting. As described in JCTVC-R0147, for intra coded CUs, intra BC coded CU, and inter coded CUs, a video encoder conditionally signals a flag to indicate the usage of an adaptive color transform. When ACT is enabled for one CU, a video encoder firstly converts the prediction errors (i.e., residual data), which may be determined using either intra prediction (including intra BC) or inter prediction, to a different color space by invoking a color transform. The video encoder then treats the converted prediction errors in the same way as those blocks with ACT disabled, i.e., by invoking CCP, transform, quantization and entropy coding in order. At the decoder side, after invoking CCP, an inverse color transform module is added if the current CU is coded with ACT enabled.

Figure 5:
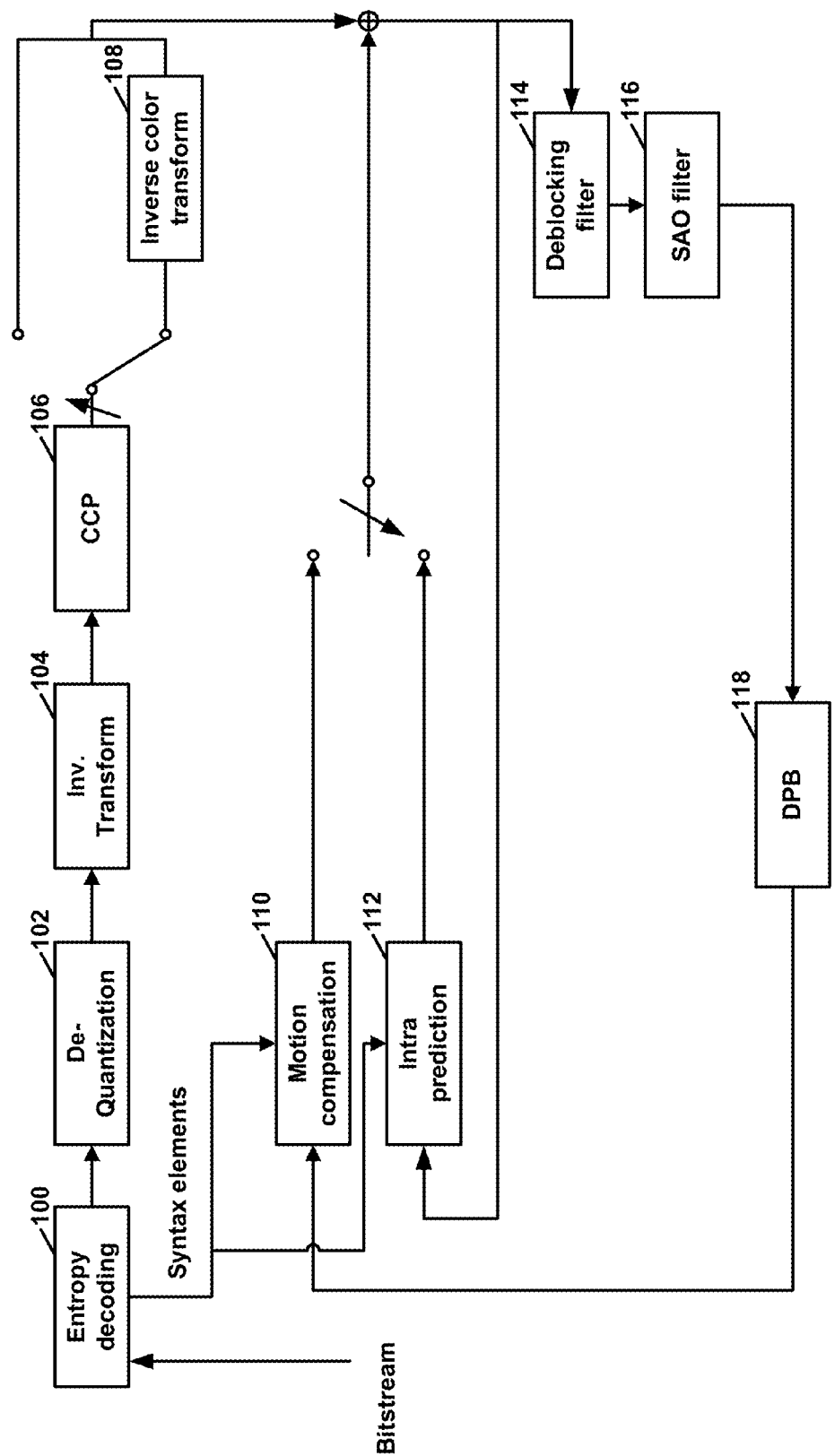
FIG. 5 is a block diagram illustrating an example decoding process in screen content coding.

FIG. 5 is a block diagram illustrating an example decoding process in screen content coding. Although described with regard to screen content coding, the decoding process of FIG. 5 is not limited to screen content coding. Thus, FIG. 5 depicts the decoding flow with ACT included. In the example of FIG. 5, a video decoder comprises an entropy decoding unit 100, a de-quantization unit 102, an inverse transform unit 104, a CCP unit 106, an inverse color transform unit 108, a motion compensation unit 110, an intra prediction unit 112, a deblocking filter unit 114, a sample adaptive offset (SAO) filter unit 116, and a decoded picture buffer 118.

Entropy decoding unit 100 receives a bitstream. Entropy decoding unit 100 may parse syntax elements from the bitstream. As part of parsing the syntax elements from the bitstream, entropy decoding unit 100 may entropy decode data in the bitstream to recover particular syntax elements, including syntax elements representing transform coefficients. De-quantization unit 102 may dequantize the transform coefficients. Inverse transform unit 104 may apply an inverse transform, such as an inverse DCT, to blocks of transform coefficients to generate blocks of residual data.

Furthermore, in the example of FIG. 5, CCP unit 106 applies an inverse CCP transform to the blocks of residual data. Inverse color transform unit 108 applies an inverse color transform to blocks of residual data. As shown in the example of FIG. 5, inverse color transform unit 108 may be bypassed for some blocks of residual data. Subsequently, residual samples generated by CCP unit 106 or inverse color transform unit 108 may be added to corresponding samples of an intra- or inter-predictive block to reconstruct samples.

Motion compensation unit 110 or intra prediction unit 112 may generate the predictive block. Intra prediction unit 112 may generate the predictive block using intra prediction. Intra prediction is a technique of predicting data elements based on data elements, such as sample values, of the same decoded slice. For instance, intra prediction unit 112 may use a directional intra prediction mode, a DC intra prediction mode, a planar intra prediction mode, intra BC, or another technique of predicting data elements, such as sample values, based on data elements of the same decoded slice. Motion compensation unit 110 may use motion compensation to generate the predictive block, e.g., using syntax elements defining a motion vector.

Deblocking filter unit 114 may apply a deblocking filter to the reconstructed samples. The deblocking filter may remove blocking artifacts. SAO filter unit 116 may apply an SAO filter to the reconstructed samples.

DPB 118 may store the reconstructed samples. Thus, DPB 118 may be a memory or computer readable storage medium configured to store video data. DPB 118 may be a reference picture memory that stores reference video data (e.g., reference pictures) for use in decoding video data by video decoder 30, e.g., in intra- or inter-coding modes. Decoded picture buffer 118 may be formed by any of a variety of memory devices, such as dynamic random access memory (DRAM), including synchronous DRAM (SDRAM), magnetoresistive RAM (MRAM), resistive RAM (RRAM), or other types of memory devices. Decoded picture buffer 118 may be provided by the same memory device or separate memory devices. In various examples, decoded picture buffer 118 may be on-chip with other components of video decoder 30, or off-chip relative to those components.

In JCTVC-R1005, the color transform is defined as follows:

YCoCg (for lossy coding):

$$\text{Forward:} \begin{bmatrix} Y \\ Co \\ Cg \end{bmatrix} = M_{fwd\_ACT} \begin{bmatrix} R \\ G \\ B \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix}, \quad (6)$$

$$\text{Inverse:} \begin{bmatrix} R \\ G \\ B \end{bmatrix} = M_{ivs\_ACT} \begin{bmatrix} Y \\ Co \\ Cg \end{bmatrix} = \begin{bmatrix} 1 & 1 & -1 \\ 1 & 0 & 1 \\ 1 & -1 & -1 \end{bmatrix} \begin{bmatrix} Y \\ Co \\ Cg \end{bmatrix}.$$

YCoCg-R (a reversible form of RGB <-> YCgCo which scales the Co and Cg components by a factor of two, for lossless coding)). By using the common lifting technique, the forward and inverse transform could be achieved by the equations below:

$$Co = R - B$$
$$t = B + \lfloor Co/2 \rfloor \quad \text{Forward:}$$
$$Cg = G - t,$$
$$Y = t + \lfloor Cg/2 \rfloor$$

$$t = Y - \lfloor Cg/2 \rfloor$$
$$G = Cg + t \quad \text{Inverse:}$$
$$B = t - \lfloor Co/2 \rfloor.$$
$$R = B + Co$$

Since both CCP and ACT are independent from neighboring blocks and neighboring pixels, both CCP and ACT may be performed with pixel-level processing. Although an ACT flag is signalled at the CU level and CCP is signalled at the TU level, both of them could be performed at the pixel level. The ACT flag may indicate whether the color transform is applied. If both ACT and CCP are performed at the pixel/TU level, decoding delay may be reduced.

Xiaoyu Xiu et al., "On inter-component de-correlation for screen content coding," Joint Collaborative Team on Video Coding (JCT-VC) of ITU-T SG 16 WP 3 and ISO/IEC JTC 1/SC 29/WG 11, 18th Meeting: Sapporo, J P, 30 Jun.-9 Jul. 2014, document JCTVC-S0179 (hereinafter, "JCTVC-S0179"), which is available at http://phenix.int-evey.fr/jct/doc_end_user/current_document.php?id=9626, described merging the two steps (i.e., CCP and ACT) into one step by using a different transform matrix for lossy coding.

Based on the assumption that $BD_c$ is equal to $BD_Y$, for lossy coding, the combined decoding process can be achieved by simply multiplying the matrices of the two operations, i.e., $$\begin{bmatrix} G \\ B \\ R \end{bmatrix} = \quad (7)$$

$$M_{inv-ACT} M_{inv-CCP} \begin{bmatrix} Y \\ C_g \\ C_o \end{bmatrix} = \frac{1}{8} \begin{bmatrix} 1 & 1 & 0 \\ 1 & -1 & -1 \\ 1 & -1 & 1 \end{bmatrix} \begin{bmatrix} 8 & 0 & 0 \\ a_{C_g} & 8 & 0 \\ a_{C_o} & 0 & 8 \end{bmatrix} \begin{bmatrix} Y \\ C_g \\ C_o \end{bmatrix} =$$

$$\frac{1}{8} \begin{bmatrix} 8 + a_{C_g} & 0 & 0 \\ 8 - (a_{C_g} + a_{C_o}) & -8 & -8 \\ 8 - (a_{C_g} - a_{C_o}) & -8 & 8 \end{bmatrix} \begin{bmatrix} Y \\ C_g \\ C_o \end{bmatrix}$$

In the case that $BD_c$ is different from $BD_Y$, for lossy coding, by replacing the above formula (3) by (5), the corresponding decoding process may be defined as:

$$\begin{bmatrix} G \\ B \\ R \end{bmatrix} = M_{inv-ACT} M_{inv-CCP} \begin{bmatrix} Y \\ C_g \\ C_o \end{bmatrix} \quad (8)$$

$$= \frac{1}{2^{3+BD_Y}} \begin{bmatrix} 1 & 1 & 0 \\ 1 & -1 & -1 \\ 1 & -1 & 1 \end{bmatrix}$$

-continued $$\begin{bmatrix} 1<<(3+BD_Y) & 0 & 0 \\ a_{cg}<<BD_C & 1<<(3+BD_Y) & 0 \\ a_{co}<<BD_C & 0 & 1<<(3+BD_Y) \end{bmatrix} \begin{bmatrix} Y \\ C_g \\ C_o \end{bmatrix}$$

$$= \frac{1}{2^{3+BD_Y}} \begin{bmatrix} 2^{3+BD_Y} + (a_{C_g}<<BD_C) & 2^{3+BD_Y} & 0 \\ 2^{3+BD_Y} - (a_{C_g}<<BD_C) - 2^{3+BD_Y} & -2^{3+BD} \\ (a_{C_o}<<BD_C) & & \\ 2^{3+BD_Y} - (a_{C_g}<<BD_C) - 2^{3+BD_Y} & 2^{3+BD_Y} \\ (a_{C_o}<<BD_C) & & \end{bmatrix}$$

$$\begin{bmatrix} Y \\ C_g \\ C_o \end{bmatrix}$$

That is, given the input sample represented by $r_Y[x][y]$, $r_{Cb}[x][y]$, $r_{Cr}[x][y]$ for three color components, the outputs of the modified sample values are calculated with the following steps:

bShift=BDY+3
wPara0=1<<bShift
wPara1=ResScaleVal[1] [xTbY] [yTbY]<<BDc
wPara2=ResScaleVal[2] [xTbY] [yTbY]<<BDc
resCoeffY=(wPara0+wPara1)*rY[x] [y]+wPara0*rCb[x] [y]
tmp0=(wPara0−wPara1)*rY[x] [y]−wPara0*rCb[x] [y]
tmp1=wPara2*rY[x] [y]+wPara0*rCr[x] [y]
resCoeffCb=tmp0−tmp1
resCoeffCr=tmp0+tmp1
rY[x] [y]=resCoeffY>>bShift
rCb[x] [y]=resCoeffCb>>bShift
rCr[x] [y]=resCoeffCr>>bShift The input of (8) and the steps above are Y (Y), Cg (Cb), and Co (Cr); the output of (8) and the steps above are G (rY), B (rCb), R (rCr). Thus, in (8) and the steps above, there are different variables but with same meanings. In the steps above, ResScaleVal[1] [xTbY] [yTbY] and ResScaleVal[2] [xTbY] [yTbY] represent Cross Component Prediction (CCP) parameters corresponding to $r_{Cb}$ and $r_{Cr}$, respectively. For instance, the input sample is assumed to be at location (xTbY, yTby) within the transform block. Hence, ResScaleVal[1] [xTbY] [yTbY] is the scaling parameter α for the Cb and ResScalVal[1] [xTbY] [yTbY] is the scaling parameter α for Cr.

The design of JCTVC-S0179 has at least the following problem. When comparing the combined steps in equation (8) with the original inverse YCoCg transform, it is noted that the internal bit-depth is increased by (3+BitDepth$_Y$). In addition, more complicated multiplications are required since the absolute transform coefficients are no longer less than 2. Examples of this disclosure may reduce the decoder complexity compared to the design in JCTVC-S0179.

When the inverse CCP and inverse ACT are combined together, i.e., using one step instead of two consecutive steps, and for the determination of the bits of right shift at the final stage, the difference of the bit-depth of luma and components is taken into consideration instead of just considering the bit depth of the luma component. To be more precise, the definition of bShift in JCTVC-S0179 is replaced by 3+max (0, BitDepthY−BitDepthC)) wherein the max function returns the larger value of two variables. In this case, the internal bit-depth increment is reduced from (3+BitDepth$_Y$) to (3+max (0, BitDepth$_Y$−BitDepth$_C$))).

The modified decoding process is defined as follows, with deletions relative to JCTVC-S0179 shown enclosed in double brackets and italicized (e.g., [[example]]) and additions relative to JCTVC-S0179 underlined (e.g., example):

bShift=[[BD$_Y$+]] 3+max(0, BitDepth$_Y$−BitDepth$_C$))
wPara0=1<<bShift
wPara1=(ResScaleVal[1] [xTbY] [yTbY]<<[[BDc]] max (0, BitDepth$_C$−BitDepth$_Y$))
wPara2=(ResScaleVal[2] [xTbY] [yTbY]<<[[BDc]] max (0,BitDepth$_C$−BitDepth$_Y$))
resCoeff$_Y$=(wPara0+wPara1)*r$_Y$[x] [y]+wPara0*r$_{Cb}$[x] [y]
tmp0=(wPara0−wPara1)*r$_Y$[x] [y]−wPara0*r$_{Cb}$[x] [y]
tmp1=wPara2*r$_Y$[x] [y]+wPara0*r$_{Cr}$[x] [y]
resCoeff$_{Cb}$=tmp0−tmp1
resCoeff$_{Cr}$=tmp0+tmp1
r$_Y$[x] [y]=resCoeffy−bShift
r$_{Cb}$[x] [y]=resCoeff$_{Cb}$>>bShift
r$_{Cr}$[x] [y]=resCoeff$_{Cr}$>>bShift Thus, in accordance with an example of this disclosure, a video coder, such as video encoder 20 or video decoder 30 may transform, based on a difference between a bit depth of an initial luma sample and a bit depth of initial chroma samples, a set of initial samples to a set of modified samples. In this example, the set of initial samples includes an initial luma sample and initial chroma samples. In some examples, the set of initial chroma samples includes an initial Cb sample and an initial Cr sample. The set of modified samples includes a modified luma sample and modified chroma samples. In some examples, the modified chroma samples includes a modified Cb sample and a modified Cr sample. The video coder may add the modified samples to corresponding samples of a predictive block to produce reconstructed samples.

In some examples, when applying the transform, the video coder determines a bit shift value (e.g., bShift) as 3 plus a maximum of 0 and a value equal to a bit depth of the initial luma sample (e.g., BitDepth$_Y$) minus a bit depth of the initial chroma samples (e.g., BitDepth$_{Cc}$). The video coder may determine a first parameter value (e.g., wPara0) as 1 left shifted by the bit shift value. The video coder may determine a second parameter value (e.g., wPara1) as a cross-component prediction parameter for the initial Cb sample left shifted by a maximum of 0 and a value equal to the bit depth of the initial chroma samples minus the bit depth of the initial luma sample. The video coder may determine a third parameter value (e.g., wPara2) as a cross-component prediction parameter for the initial Cr sample left shifted by a maximum of 0 and the value equal to the bit depth of the initial chroma samples minus the bit depth of the initial luma sample.

In this example, the video coder determines a luma residual coefficient value (e.g., resCoeff$_Y$) as a sum of the first parameter value and the second parameter value, multiplied by the initial luma sample, plus the first parameter value multiplied by the initial Cb sample. Furthermore, the video coder determines a first chroma residual coefficient value (e.g., resCoeff$_{Cb}$) as a difference between a first intermediate value (e.g., tmp0) and a second intermediate value (e.g., tmp1). In this example, the first intermediate value is equal to the first parameter value minus the second parameter value, multiplied by the initial luma sample, minus the first parameter value times the initial Cb sample. Furthermore, in this example, the second intermediate value is equal to the third parameter value multiplied by the initial luma sample, plus the first parameter value multiplied by the initial Cr sample. The video coder determines a second chroma residual coefficient value (e.g., resCoeff$_{Cr}$) as a sum of the first intermediate value and the second intermediate value.

In this example, the video coder determines the modified luma sample (e.g., r$_Y$[x] [y]) as the luma residual coefficient value right shifted by the bit shift value. In this example, the video coder determines the modified Cb sample (e.g., r$_{Cb}$[x] [y]) as the first chroma coefficient value right shifted by the bit shift value. In this example, the video coder determines the modified Cr sample (e.g., r$_{Cr}$[x] [y]) as the second chroma coefficient value right shifted by the bit shift value.

In instances where the video coder is a video encoder, such as video encoder 20, the video coder may signal, in a bitstream, syntax elements indicating the cross-component prediction parameter for the initial Cb sample and the cross-component prediction parameter for the initial Cr sample. Similarly, in instances where the video coder is a video decoder, such as video decoder 30, the video coder may obtain, from a bitstream, syntax elements indicating the cross-component prediction parameter for the initial Cb sample and the cross-component prediction parameter for the initial Cr sample.

Alternatively, the following may apply to the definitions of wPara1 and wPara2:

wPara1=(ResScaleVal[1] [xTbY] [yTbY]<<BitDepthc) >>min(BitDepth$_Y$, BitDepthc)

wPara2=(ResScaleVal[2] [xTbY] [yTbY]<<BitDepthc) >>min(BitDepth$_Y$, BitDepthc)

Figure 6:
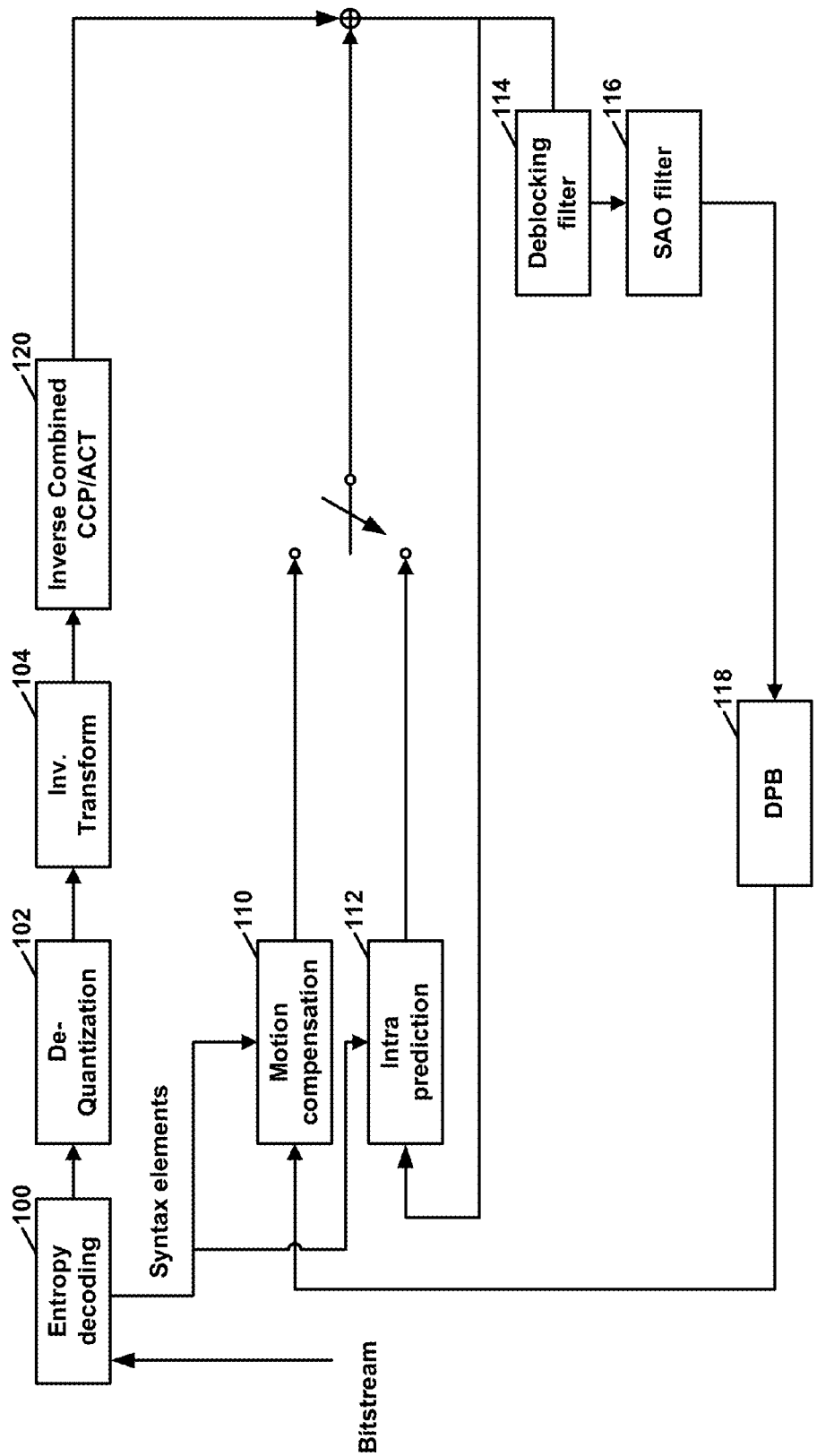
FIG. 6 is a block diagram illustrating an example implementation of a video decoder, in accordance with a technique of this disclosure.

FIG. 6 is a block diagram illustrating an example implementation of video decoder 30, in accordance with a technique of this disclosure. The example implementation of video decoder 30 shown in FIG. 6 is similar to the video decoder of FIG. 5. However, instead of including CCP unit 106 and inverse color transform unit 108, the video decoder of FIG. 6 includes a combined CCP/ACT unit 120. Combined CCP/ACT unit 120 applies a combined inverse CCP and ACT.

In accordance with one or more techniques of this disclosure, combined CCP/ACT unit 120 transforms, based on a difference between a bit depth of an initial luma sample and a bit depth of initial chroma samples, a set of initial samples to a set of modified samples, the set of initial samples including the initial luma sample and the initial chroma samples. The initial chroma samples includes an initial Cb sample and an initial Cr sample. The set of modified samples includes a modified luma sample and modified chroma samples. The modified chroma samples include a modified Cb sample and a modified Cr sample.

Figure 7:
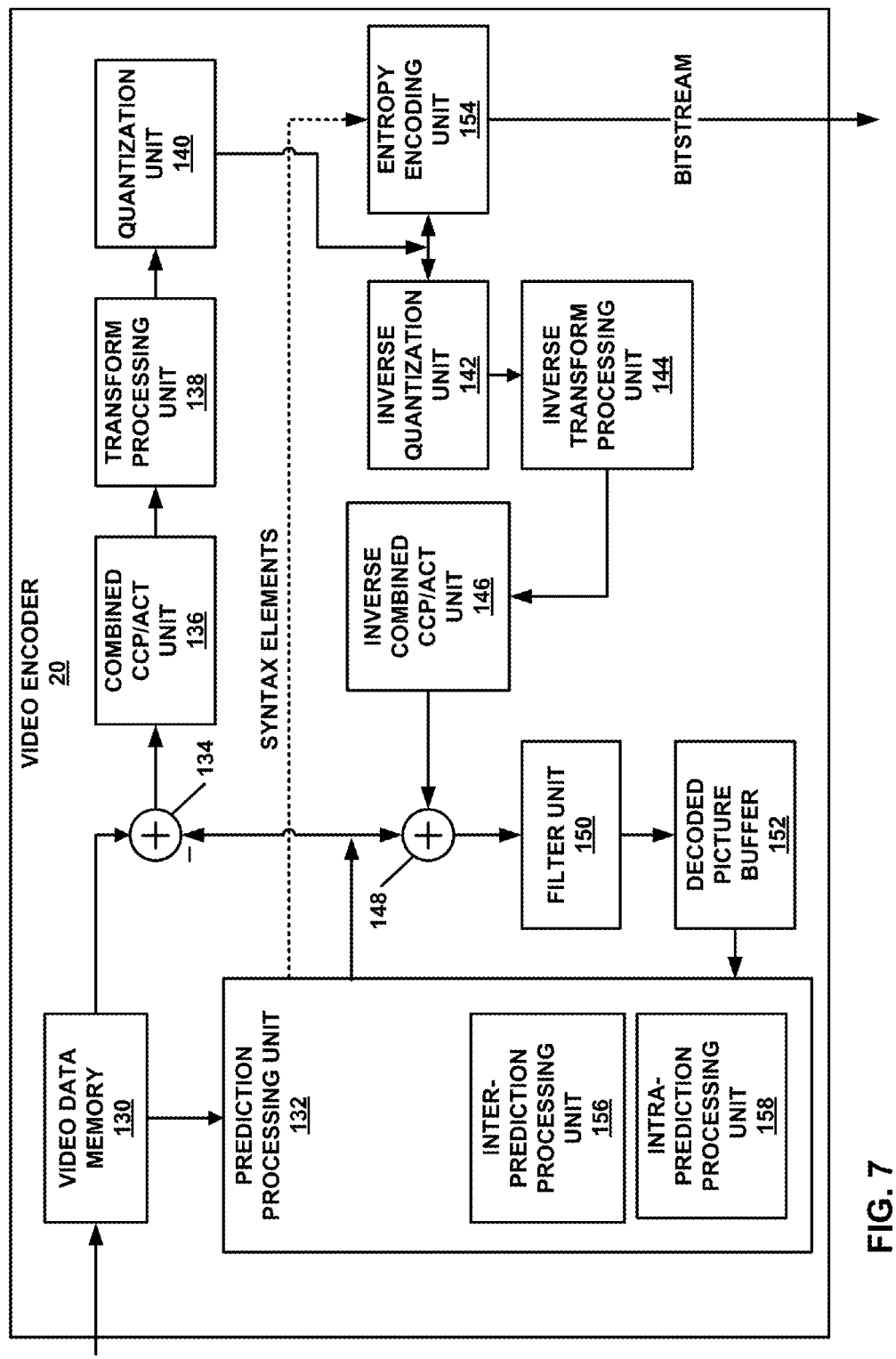
FIG. 7 is a block diagram illustrating an example implementation of a video encoder, in accordance with a technique of this disclosure.

FIG. 7 is a block diagram illustrating an example implementation of video encoder 20, in accordance with a technique of this disclosure. FIG. 7 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 7, video encoder 20 includes a video data memory 130, a prediction processing unit 132, a residual generation unit 134, a combined CCP/ACT unit 136, a transform processing unit 138, a quantization unit 140, an inverse quantization unit 142, an inverse transform processing unit 144, an inverse combined CCP/ACT unit 146, a reconstruction unit 148, a filter unit 150, a decoded picture buffer 152, and an entropy encoding unit 154. Prediction processing unit 132 includes an inter-prediction processing unit 156 and an intra-prediction processing unit 158. In other examples, video encoder 20 may include more, fewer, or different functional components.

Video data memory 130 may store video data to be encoded by the components of video encoder 20. The video data stored in video data memory 130 may be obtained, for example, from video source 18. Decoded picture buffer 152 may be a reference picture memory that stores reference video data for use in encoding video data by video encoder 20, e.g., in intra- or inter-coding modes. Video data memory 130 and decoded picture buffer 152 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 130 and decoded picture buffer 152 may be provided by the same memory device or separate memory devices. In various examples, video data memory 130 may be on-chip with other components of video encoder 20, or off-chip relative to those components.

Video encoder 20 may encode CUs of a CTU to generate encoded representations of the CUs (i.e., coded CUs). As part of encoding a CU, prediction processing unit 132 may partition the coding blocks associated with the CU among one or more PUs of the CU. Thus, each PU may be associated with a luma prediction block and corresponding chroma prediction blocks. Inter-prediction processing unit 156 may generate predictive data for a PU by performing inter prediction on each PU of a CU. The predictive data for the PU may include predictive blocks of the PU and motion information for the PU. Intra-prediction processing unit 158 may generate predictive data for a PU by performing intra prediction on the PU. Prediction processing unit 132 may select the predictive data for PUs of a CU from among the predictive data generated by inter-prediction processing unit 156 for the PUs or the predictive data generated by intra-prediction processing unit 158 for the PUs.

Residual generation unit 134 may generate, based on the coding blocks of a CU and the selected predictive blocks of the PUs of the CU, residual blocks of the CU. For instance, residual generation unit 134 may generate the residual blocks of the CU such that each sample in the residual blocks has a value equal to a difference between a sample in a coding block of the CU and a corresponding sample in a corresponding selected predictive sample block of a PU of the CU.

Combined CCP/ACT unit 136 applies a combined CCP and ACT to the residual data generated by residual generation unit 134. Combined CCP/ACT unit 136 may transform, based on a difference between a bit depth of an initial luma sample and a bit depth of initial chroma samples, a set of initial samples to a set of modified samples. The set of initial samples includes the initial luma sample and the initial chroma samples. The initial chroma samples includes an initial Cb sample and an initial Cr sample. The set of modified samples include a modified luma sample and modified chroma samples. The modified chroma samples include a modified Cb sample and a modified Cr sample. In some examples, the three color components may be named in a different way, such as (Y, Cb, Cr).

Transform processing unit 138 may generate transform coefficient blocks for each TU of a CU by applying one or more transforms to the transform blocks of the TU. Transform processing unit 138 may apply various transforms to a transform block of a TU. For example, transform processing unit 138 may apply a discrete cosine transform (DCT), a directional transform, or a conceptually similar transform to a transform block. In some examples, transform processing unit 138 does not apply transforms to a transform block. In such examples, the transform block may be treated as a transform coefficient block.

Quantization unit 140 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization may introduce loss of information, thus quantized transform coefficients may have lower precision than the original ones.

Inverse quantization unit 142 and inverse transform processing unit 144 may apply inverse quantization and inverse transforms to a coefficient block, respectively, to reconstruct a residual block from the coefficient block. Inverse combined CCP/ACT unit 146 applies an inverse CCP and ACT to the residual data generated by inverse transform processing unit 144. For instance, in accordance with the techniques of this disclosure, inverse combined CCP/ACT unit 146 may transform, based on a difference between a bit depth of an initial luma sample and a bit depth of initial chroma samples, a set of initial samples to a set of modified samples. The set of initial samples includes the initial luma sample and the initial chroma samples. The initial chroma samples includes an initial Cb sample and an initial Cr sample. The set of modified samples includes a modified luma sample and modified chroma samples. The modified chroma samples include a modified Cb sample and a modified Cr sample.

Reconstruction unit 148 may add the reconstructed residual block to corresponding samples from one or more predictive sample blocks generated by prediction processing unit 132 to produce a reconstructed transform block associated with a TU. By reconstructing transform blocks for each TU of a CU in this way, video encoder 20 may reconstruct the coding blocks of the CU. In this way, video encoder 20 may perform a method of decoding video data.

Filter unit 150 may perform one or more deblocking operations to reduce blocking artifacts in the coding blocks associated with a CU. Decoded picture buffer 152 may store the reconstructed coding blocks after filter unit 150 performs the one or more deblocking operations on the reconstructed coding blocks. Inter-prediction processing unit 156 may use a reference picture containing the reconstructed coding blocks to perform inter prediction on PUs of other pictures.

Entropy encoding unit 154 may receive data from other functional components of video encoder 20. For example, entropy encoding unit 154 may receive coefficient blocks from quantization unit 140 and may receive syntax elements from prediction processing unit 132. Entropy encoding unit 154 may perform one or more entropy encoding operations on the data to generate entropy-encoded data. For example, entropy encoding unit 154 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 154. For instance, the bitstream may include data that represents a RQT for a CU.

Figure 8:
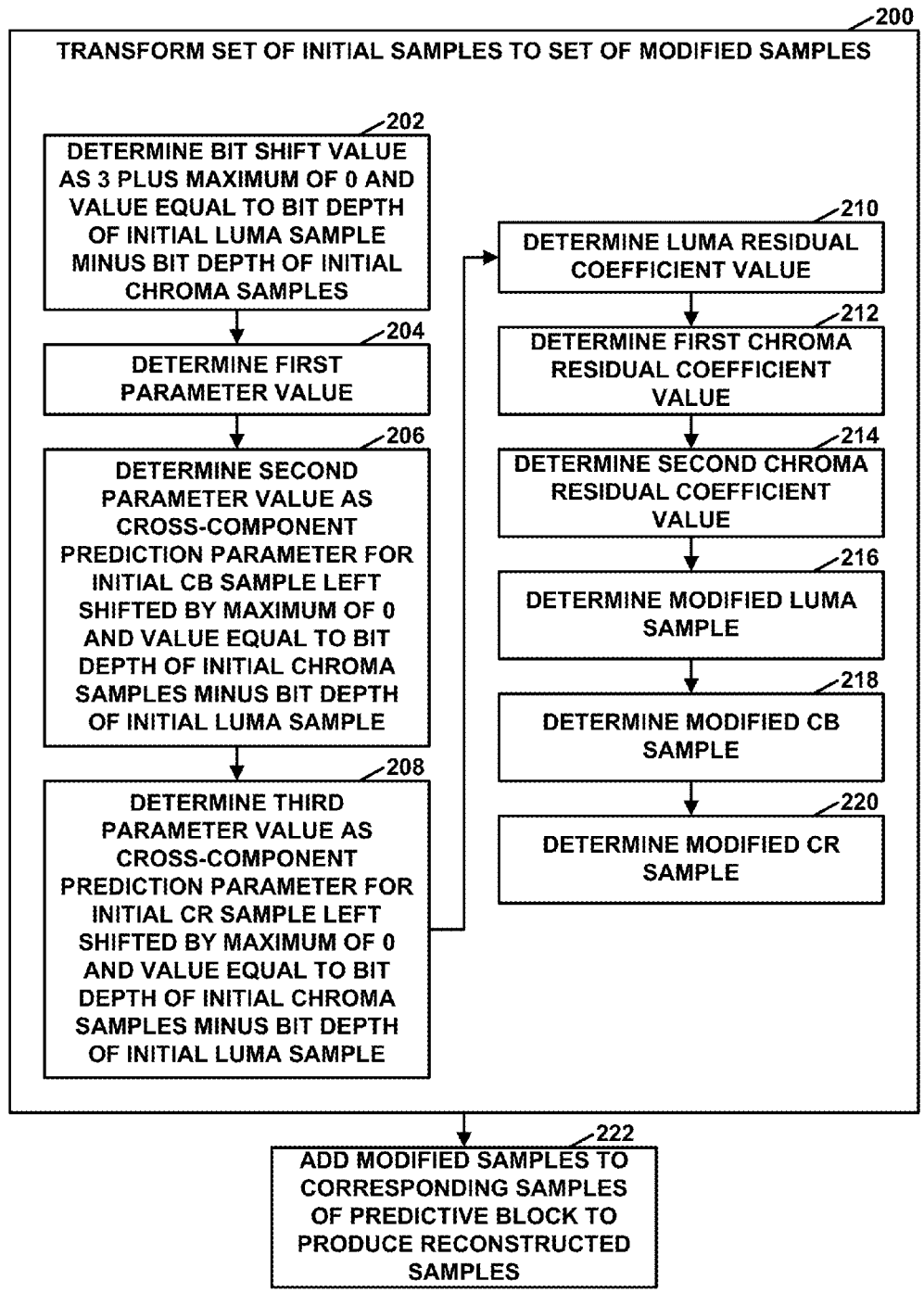
FIG. 8 is a flowchart illustrating an example operation of a video coder, in accordance with a technique of this disclosure.

FIG. 8 is a flowchart illustrating an example operation of a video coder, such as video encoder 20 or video decoder 30, in accordance with a technique of this disclosure. FIG. 8 is provided as an example. Other examples may include more, fewer, or different actions. Furthermore, in other examples, the actions may be in different orders.

In the example of FIG. 8, the video coder may transform, based on a difference between a bit depth of an initial luma sample and a bit depth of initial chroma samples, a set of initial samples to a set of modified samples (200). The set of initial samples includes the initial luma sample (e.g., $r_Y[x][y]$) and the initial chroma samples. In some examples, the initial chroma samples includes an initial Cb sample (e.g., $r_{Cb}[x][y]$) and an initial Cr sample (e.g., $r_{Cr}[x][y]$). The set of modified samples includes a modified luma sample and modified chroma samples. In some examples, the modified chroma samples includes a modified Cb sample and a modified Cr sample.

In the example of FIG. 8, to transform the initial samples, the video coder may determine a bit shift value (e.g., bShift) as 3 plus a maximum of 0 and a value equal to the bit depth of the initial luma sample (e.g., $BitDepth_Y$) minus the bit depth of the initial chroma samples (e.g., $BitDepth_C$) (202).

The video coder may determine a first parameter value (e.g., wPara0) as 1 left shifted by the bit shift value (204). Additionally, the video coder may determine a second parameter value (e.g., wPara1) as a cross-component prediction parameter for the initial Cb sample (e.g., ResScalVal[1][xTbY][yTbY]) left shifted by a maximum of 0 and a value equal to the bit depth of the initial chroma samples minus the bit depth of the initial luma sample (206). The video coder may determine a third parameter value as a cross-component prediction parameter for the initial Cr sample (e.g., ResScalVal[2][xTbY][yTbY]) left shifted by a maximum of 0 and the value equal to the bit depth of the initial chroma samples minus the bit depth of the initial luma sample (208).

The video coder may determine a luma residual coefficient value ($resCoeff_Y$) as a sum of the first parameter value and the second parameter value, multiplied by the initial luma sample, plus the first parameter value multiplied by the initial Cb sample (210). The video coder may determine a first chroma residual coefficient value (e.g., $resCoeff_{Cb}$) as a difference between a first intermediate value (e.g., tmp0) and a second intermediate value (e.g., tmp1) (212). The first intermediate value may be equal to the first parameter value minus the second parameter value, multiplied by the initial luma sample, minus the first parameter value times the initial Cb sample (e.g., $tmp0 = (wPara0 - wPara1) * r_Y[x][y] - wPara0 * r_{Cb}[x][y]$). The second intermediate value is equal to the third parameter value multiplied by the initial luma sample, plus the first parameter value multiplied by the initial Cr sample (e.g., $tmp1 = wPara2 * r_Y[x][y] + wPara0 * r_{Cr}[x][y]$). The video coder may determine a second chroma residual coefficient value (e.g., $resCoeff_{Cr}$) as a sum of the first intermediate value and the second intermediate value (214).

The video coder may determine the modified luma sample as the luma residual coefficient value right shifted by the bit shift value (e.g., $resCoeff_Y >> bShift$) (216). The video coder may determine the modified Cb sample as the first chroma coefficient value right shifted by the bit shift value (e.g., $resCoeff_{Cb} >> bShift$) (218). The video coder may determine the modified Cr sample as the second chroma coefficient value right shifted by the bit shift value (e.g., $resCoeff_{Cr} >> bShift$) (220).

After transforming the initial samples to the modified samples, the video coder may add the modified samples to corresponding samples of a predictive block to produce reconstructed samples (222). In the context of an encoding process, the reconstructed samples may be used for inter prediction of other blocks. In the decoding process the reconstructed samples may be stored for output and display.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In one or more examples, the functions described may be implemented in hardware (e.g., electronic hardware), software, firmware, or any combination thereof. If implemented in software, the functions may be stored on or transmitted over as one or more instructions or code on a computer-readable medium and executed by a hardware-based processing unit. If implemented in software, the techniques may be realized at least in part by a computer-readable data storage medium comprising program code including instructions that, when executed, performs one or more of the methods described above. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any con is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    applying inverse cross-component prediction (ICCP) and an inverse adaptive color transform (TACT) together in a single step, wherein applying ICCP and the TACT together comprises transforming, based on a difference between a bit depth of luma samples and a bit depth of chroma samples, a set of initial residual samples to a set of modified residual samples, the set of initial residual samples including an initial residual luma sample and initial residual chroma samples, the set of modified residual samples including a modified residual luma sample and modified residual chroma samples, wherein:
        the initial residual chroma samples include an initial residual Cb sample and an initial residual Cr sample,
        the modified residual chroma samples include a modified residual Cb sample and a modified residual Cr sample, and
        transforming the set of initial residual samples comprises:
            determining a bit shift value as 3 plus a maximum of 0 and a value equal to the bit depth of the luma samples minus the bit depth of the chroma samples;
            determining a first parameter value as 1 left shifted by the bit shift value;

determining a second parameter value as a cross-component prediction parameter for the initial residual Cb sample left shifted by a maximum of 0 and a value equal to the bit depth of the chroma samples minus the bit depth of the luma samples;

determining a third parameter value as a cross-component prediction parameter for the initial residual Cr sample left shifted by a maximum of 0 and the value equal to the bit depth of the chroma samples minus the bit depth of the luma samples;

determining a luma residual coefficient value as a sum of the first parameter value and the second parameter value, multiplied by the initial residual luma sample, plus the first parameter value multiplied by the initial residual Cb sample;

determining a first chroma residual coefficient value as a difference between a first intermediate value and a second intermediate value, the first intermediate value being equal to the first parameter value minus the second parameter value, multiplied by the initial residual luma sample, minus the first parameter value times the initial residual Cb sample, the second intermediate value being equal to the third parameter value multiplied by the initial residual luma sample, plus the first parameter value multiplied by the initial residual Cr sample;

determining a second chroma residual coefficient value as a sum of the first intermediate value and the second intermediate value;

determining the modified residual luma sample as the luma residual coefficient value right shifted by the bit shift value;

determining the modified residual Cb sample as the first chroma coefficient value right shifted by the bit shift value; and determining the modified residual Cr sample as the second chroma coefficient value right shifted by the bit shift value; and adding the modified residual samples to corresponding samples of a predictive block to produce reconstructed samples of the video data.

2. The method of claim 1, further comprising:
obtaining, from a bitstream, syntax elements indicating the cross-component prediction parameter for the initial residual Cb sample and the cross-component prediction parameter for the initial residual Cr sample.

3. The method of claim 1, further comprising:
signaling, in a bitstream, syntax elements indicating the cross-component prediction parameter for the initial residual Cb sample and the cross-component prediction parameter for the initial residual Cr sample.

4. A device for coding video data, the device comprising:
a data storage medium configured to store the video data; and
one or more processors configured to:
apply inverse cross-component prediction (ICCP) and an inverse adaptive color transform (IACT) together in a single step, wherein the one or more processors are configured such that, as part of applying the ICCP and IACT, the one or more processors transform, based on a difference between a bit depth of luma samples and a bit depth of chroma samples, a set of initial residual samples to a set of modified residual samples, the set of initial residual samples including an initial residual luma sample and initial residual chroma samples, the set of modified residual samples including a modified residual luma sample and modified residual chroma samples, wherein:

the initial residual chroma samples include an initial residual Cb sample and an initial residual Cr sample, the modified residual chroma samples include a modified residual Cb sample and a modified residual Cr sample, and the one or more processors are configured such that, as part of transforming the set of initial residual samples, the one or more processors:

determine a bit shift value as 3 plus a maximum of 0 and a value equal to the bit depth of the luma samples minus the bit depth of the chroma samples;

determine a first parameter value as 1 left shifted by the bit shift value;

determine a second parameter value as a cross-component prediction parameter for the initial residual Cb sample left shifted by a maximum of 0 and a value equal to the bit depth of the chroma samples minus the bit depth of the luma samples;

determine a third parameter value as a cross-component prediction parameter for the initial residual Cr sample left shifted by a maximum of 0 and the value equal to the bit depth of the chroma samples minus the bit depth of the luma samples;

determine a luma residual coefficient value as a sum of the first parameter value and the second parameter value, multiplied by the initial residual luma sample, plus the first parameter value multiplied by the initial residual Cb sample;

determine a first chroma residual coefficient value as a difference between a first intermediate value and a second intermediate value, the first intermediate value being equal to the first parameter value minus the second parameter value, multiplied by the initial residual luma sample, minus the first parameter value times the initial residual Cb sample, the second intermediate value being equal to the third parameter value multiplied by the initial residual luma sample, plus the first parameter value multiplied by the initial residual Cr sample;

determine a second chroma residual coefficient value as a sum of the first intermediate value and the second intermediate value;

determine the modified residual luma sample as the luma residual coefficient value right shifted by the bit shift value;

determine the modified residual Cb sample as the first chroma coefficient value right shifted by the bit shift value; and determine the modified residual Cr sample as the second chroma coefficient value right shifted by the bit shift value; and add the modified residual samples to corresponding samples of a predictive block to produce reconstructed samples of the video data.

5. The device of claim 4, wherein the one or more processors are configured to:
obtain, from a bitstream, syntax elements indicating the cross-component prediction parameter for the initial residual Cb sample and the cross-component prediction parameter for the initial residual Cr sample.

6. The device of claim 4, wherein the one or more processors are configured to:
signal, in a bitstream, syntax elements indicating the cross-component prediction parameter for the initial residual Cb sample and the cross-component prediction parameter for the initial residual Cr sample.

7. The device of claim 4, wherein the device comprises at least one of:
an integrated circuit;
a microprocessor; or
a wireless handset.

8. The device of claim 4, further comprising a display configured to display decoded video data.

9. The device of claim 4, further comprising a camera configured to capture the video data.

10. A device for coding video data, the device comprising:
means for applying inverse cross-component prediction (ICCP) and an inverse adaptive color transform (IACT) together in a single step, wherein the means for applying ICCP and the IACT together in a single step comprises means for transforming, based on a difference between a bit depth of luma samples and a bit depth of chroma samples, a set of initial residual samples to a set of modified residual samples, the set of initial residual samples including an initial residual luma sample and initial residual chroma samples, the set of modified residual samples including a modified residual luma sample and modified residual chroma samples, wherein:
the initial residual chroma samples include an initial residual Cb sample and an initial residual Cr sample,
the modified residual chroma samples include a modified residual Cb sample and a modified residual Cr sample, and
the means for transforming the set of initial residual samples comprises:
means for determining a bit shift value as 3 plus a maximum of 0 and a value equal to the bit depth of the luma samples minus the bit depth of the chroma samples;
means for determining a first parameter value as 1 left shifted by the bit shift value;
means for determining a second parameter value as a cross-component prediction parameter for the initial residual Cb sample left shifted by a maximum of 0 and a value equal to the bit depth of the chroma samples minus the bit depth of the luma samples;
means for determining a third parameter value as a cross-component prediction parameter for the initial residual Cr sample left shifted by a maximum of 0 and the value equal to the bit depth of the chroma samples minus the bit depth of the luma samples;
means for determining a luma residual coefficient value as a sum of the first parameter value and the second parameter value, multiplied by the initial residual luma sample, plus the first parameter value multiplied by the initial residual Cb sample;
means for determining a first chroma residual coefficient value as a difference between a first intermediate value and a second intermediate value, the first intermediate value being equal to the first parameter value minus the second parameter value, multiplied by the initial residual luma sample, minus the first parameter value times the initial residual Cb sample,
the second intermediate value being equal to the third parameter value multiplied by the initial residual luma sample, plus the first parameter value multiplied by the initial residual Cr sample;
means for determining a second chroma residual coefficient value as a sum of the first intermediate value and the second intermediate value;
means for determining the modified residual luma sample as the luma residual coefficient value right shifted by the bit shift value;
means for determining the modified residual Cb sample as the first chroma coefficient value right shifted by the bit shift value; and
means for determining the modified residual Cr sample as the second chroma coefficient value right shifted by the bit shift value; and
means for adding the modified residual samples to corresponding samples of a predictive block to produce reconstructed samples of the video data.

11. The device of claim 10, further comprising:
means for obtaining, from a bitstream, syntax elements indicating the cross-component prediction parameter for the initial residual Cb sample and the cross-component prediction parameter for the initial residual Cr sample.

12. The device of claim 10, further comprising:
means for signaling, in a bitstream, syntax elements indicating the cross-component prediction parameter for the initial residual Cb sample and the cross-component prediction parameter for the initial residual Cr sample.

13. A non-transitory computer-readable storage medium having stored thereon instructions, that when executed, cause a device for coding video data to:
apply inverse cross-component prediction (ICCP) and an inverse adaptive color transform (TACT) together in a single step, wherein the instructions cause the device to apply ICCP and the IACT together in a single step in part by causing the device to transform, based on a difference between a bit depth of luma samples and a bit depth of chroma samples, a set of initial residual samples to a set of modified residual samples, the set of initial residual samples including an initial residual luma sample and initial residual chroma samples, the set of modified residual samples including a modified residual luma sample and modified residual chroma samples, wherein:
the initial residual chroma samples include an initial residual Cb sample and an initial residual Cr sample,
the modified residual chroma samples include a modified residual Cb sample and a modified residual Cr sample, and
as part of causing the device to transform the set of initial residual samples, the instructions cause the device to:
determine a bit shift value as 3 plus a maximum of 0 and a value equal to the bit depth of the luma samples minus the bit depth of the chroma samples;
determine a first parameter value as 1 left shifted by the bit shift value;
determine a second parameter value as a cross-component prediction parameter for the initial residual Cb sample left shifted by a maximum of 0 and a value equal to the bit depth of the chroma samples minus the bit depth of the luma samples;

determine a third parameter value as a cross-component prediction parameter for the initial residual Cr sample left shifted by a maximum of 0 and the value equal to the bit depth of the initial residual chroma samples minus the bit depth of the initial residual luma sample;

determine a luma residual coefficient value as a sum of the first parameter value and the second parameter value, multiplied by the initial residual luma sample, plus the first parameter value multiplied by the initial residual Cb sample;

determine a first chroma residual coefficient value as a difference between a first intermediate value and a second intermediate value, the first intermediate value being equal to the first parameter value minus the second parameter value, multiplied by the initial residual luma sample, minus the first parameter value times the initial residual Cb sample, the second intermediate value being equal to the third parameter value multiplied by the initial residual luma sample, plus the first parameter value multiplied by the initial residual Cr sample;

determine a second chroma residual coefficient value as a sum of the first intermediate value and the second intermediate value;

determine the modified residual luma sample as the luma residual coefficient value right shifted by the bit shift value;

determine the modified residual Cb sample as the first chroma coefficient value right shifted by the bit shift value; and determine the modified residual Cr sample as the second chroma coefficient value right shifted by the bit shift value; and add the modified residual samples to corresponding samples of a predictive block to produce reconstructed samples of the video data.

14. The non-transitory computer readable storage medium of claim 13, wherein the instructions cause the device to:

obtain, from a bitstream, syntax elements indicating the cross-component prediction parameter for the initial residual Cb sample and the cross-component prediction parameter for the initial residual Cr sample.

15. The non-transitory computer readable storage medium of claim 13, wherein the instructions cause the device to:

signal, in a bitstream, syntax elements indicating the cross-component prediction parameter for the initial residual Cb sample and the cross-component prediction parameter for the initial residual Cr sample.

\* \* \* \* \*